(12) United States Patent
Scott et al.

(10) Patent No.: US 12,158,186 B2
(45) Date of Patent: Dec. 3, 2024

(54) DYNAMICALLY ENGAGEABLE ELECTROMECHANICAL BRAKE

(71) Applicant: Halliburton Energy Services, Inc., Houston, TX (US)

(72) Inventors: Bruce Edward Scott, Carrollton, TX (US); Kevin Robin Passmore, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/513,820

(22) Filed: Nov. 20, 2023

(65) Prior Publication Data

US 2024/0218908 A1 Jul. 4, 2024

Related U.S. Application Data

(60) Provisional application No. 63/436,944, filed on Jan. 4, 2023.

(51) Int. Cl.
*F16D 63/00* (2006.01)
*E21B 34/06* (2006.01)
(Continued)

(52) U.S. Cl.
CPC .......... *F16D 63/002* (2013.01); *E21B 34/066* (2013.01); *F16D 65/18* (2013.01);
(Continued)

(58) Field of Classification Search
CPC ...... E21B 34/066; F16D 63/002; F16D 65/18; F16D 2121/20; F16D 2125/852; F16D 2127/02
See application file for complete search history.

(56) References Cited

U.S. PATENT DOCUMENTS

| 4,515,251 A | 5/1985 | Wruk |
| 5,133,437 A | 7/1992 | Larson |

(Continued)

FOREIGN PATENT DOCUMENTS

| CN | 202274024 U | 6/2012 |
| CN | 202274027 U | 6/2012 |

(Continued)

OTHER PUBLICATIONS

United Kingdom Search Report for GB Patent Application No. 2318144.9 dated Apr. 23, 2024. PDF file. 4 pages.

(Continued)

*Primary Examiner* — Taras P Bemko
(74) *Attorney, Agent, or Firm* — Scott Richardson; C. Tumey Law Group PLLC

(57) ABSTRACT

Disclosed herein are systems and methods including an electromechanical brake used downhole to impart dynamic or static braking capabilities while absorbing or otherwise reducing shock loads. The electromechanical brake may be used for a downhole electromechanical linear actuator to control a valve for the production of subterranean fluid. In some examples, it may be desirable for an electromechanical linear actuator to maintain a retracted position during certain safety and/or maintenance operations. The electromechanical brake includes a brake housing, a first armature rotatably disposed in the brake housing, a second armature rotatably disposed in the brake housing for rotation by a motor, an electrical coil energizable to urge the second armature into axial engagement with the first armature, and a rotational spring for biasing the first armature to a neutral rotational position relative to the brake housing while allowing a limited rotation of the first armature relative to the brake housing.

20 Claims, 11 Drawing Sheets

(51) Int. Cl.
*F16D 65/18* (2006.01)
*F16D 121/20* (2012.01)
*F16D 125/58* (2012.01)
*F16D 127/02* (2012.01)

(52) U.S. Cl.
CPC .... *F16D 2121/20* (2013.01); *F16D 2125/582* (2013.01); *F16D 2127/02* (2013.01)

(56) References Cited

U.S. PATENT DOCUMENTS

| | | |
|---|---|---|
| 6,161,659 A | 12/2000 | Maurice |
| 9,388,635 B2 | 7/2016 | Schroter et al. |
| 10,480,283 B2 | 11/2019 | Joseph et al. |
| 11,668,161 B2 | 6/2023 | Vick, Jr. et al. |
| 2003/0047317 A1 | 3/2003 | Powers |
| 2004/0216273 A1 | 11/2004 | Kang et al. |
| 2008/0217121 A1* | 9/2008 | Cao .................. B60T 13/741 188/157 |
| 2010/0175867 A1 | 7/2010 | Wright et al. |
| 2011/0120728 A1 | 5/2011 | Lake et al. |
| 2011/0186303 A1 | 8/2011 | Scott et al. |
| 2012/0199367 A1 | 8/2012 | Bouldin et al. |
| 2020/0095843 A1* | 3/2020 | Vick, Jr. .................. F16K 5/08 |
| 2020/0308929 A1* | 10/2020 | Eriksen .................. E21B 34/14 |
| 2021/0332674 A1 | 10/2021 | Greci et al. |
| 2024/0044385 A1* | 2/2024 | Richard .................. B60T 1/005 |

FOREIGN PATENT DOCUMENTS

| | | |
|---|---|---|
| CN | 208935232 U | 6/2019 |
| CN | 110375020 A | 10/2019 |
| CN | 210461485 U | 5/2020 |
| CN | 215059031 U | 12/2021 |
| GB | 2352784 A | 2/2001 |
| WO | 2024039384 A1 | 2/2024 |

OTHER PUBLICATIONS

International Search Report and Written Opinion for International Patent Application No. PCT/US2023/082552 dated Apr. 8, 2024. PDF file. 7 pages.

Netherlands Search Report and Written Opinion for NL Patent Application No. 2036413 dated May 29, 2024. English Machine Translation with Original Untranslated Version, PDF file. 12 pages.

* cited by examiner

DYNAMICALLY ENGAGEABLE ELECTROMECHANICAL BRAKE

CROSS-REFERENCE TO RELATED APPLICATIONS

The present application claims priority to U.S. Provisional Application No. 63/436,944, filed Jan. 4, 2023, the entire disclosure of which is incorporated herein by reference.

BACKGROUND

Wellbores are commonly drilled to enable the production of subterranean fluids such as hydrocarbons (e.g., oil and gas). A plurality of interconnected tubulars, such as a casing string, may be placed and cemented in a subterranean borehole to protect the structural integrity of the subterranean borehole which thereby forms a wellbore. The casing string may additionally provide a conduit for conveying produced subterranean fluids from one or more subterranean formations (e.g., reservoirs) to a surface location. Wellbore equipment, which may be disposed in or connected to the wellbore may include one or more devices which either promote or impede the production of subterranean fluids from a subterranean formation to a surface location. For example, pumps may be utilized to convey subterranean fluids to a surface location, while production isolation devices may prevent the production of subterranean fluids.

In some scenarios, production isolation devices may function as safety devices and provide a barrier to flow from subterranean fluids. Devices, such as electromechanical linear actuators, may be included or utilized in wellbore equipment to perform certain tasks or operations. For example, extending an electromechanical linear actuator may open a valve which may further allow for fluid flow through a conduit or passageway. When the electromechanical linear actuator is in the retracted position, the valve may close and restrict or prevent fluid flow. As such, the linear actuator may need to remain in the extended position to keep the valve open and promote fluid flow through the conduit or passageway.

BRIEF DESCRIPTION OF THE DRAWINGS

These drawings illustrate certain aspects of some of the embodiments of the present disclosure and should not be used to limit or define the method.

DETAILED DESCRIPTION

Figure 1:
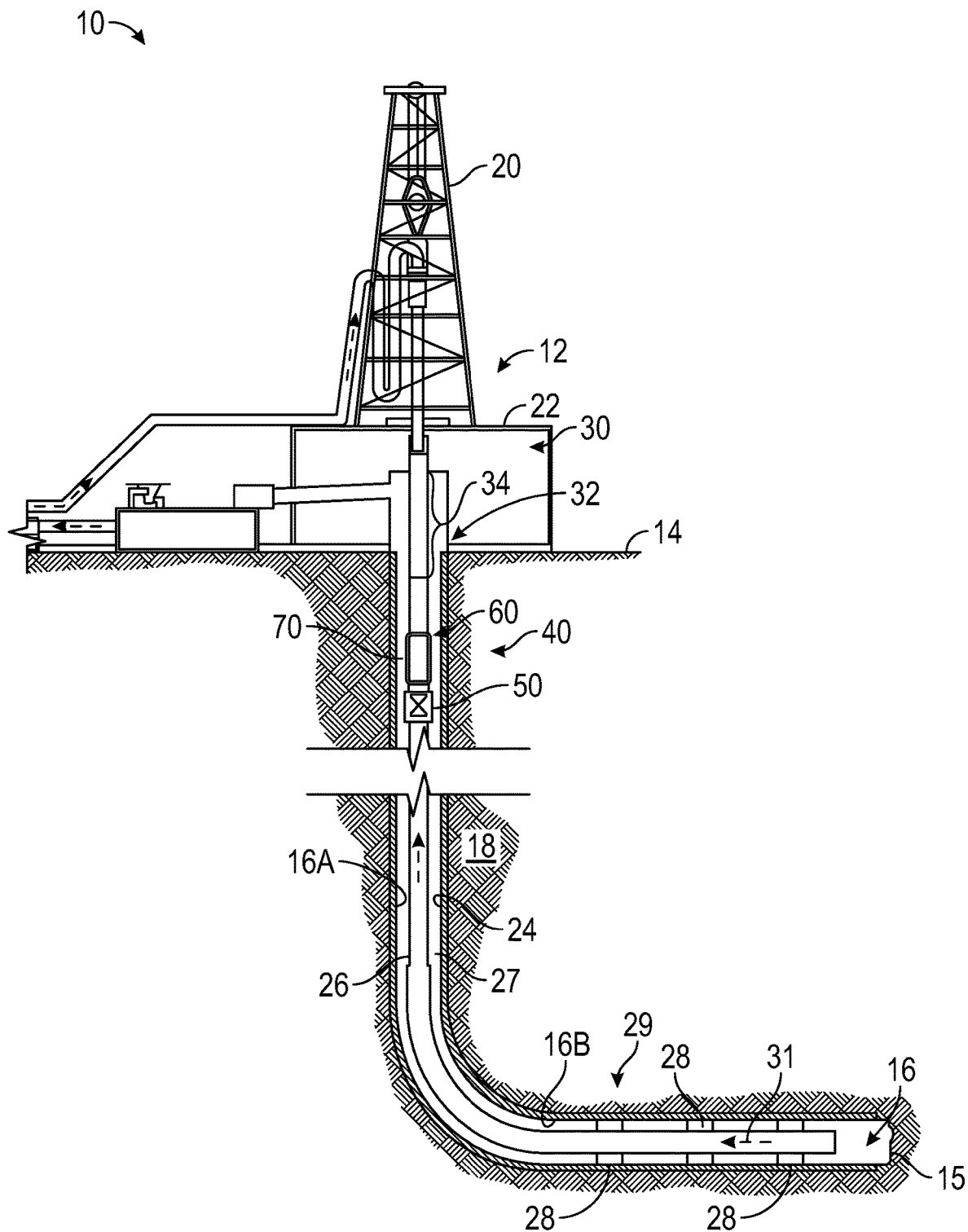
FIG. 1 is a section view of a well site in which an electromechanical linear actuator may be deployed.

Aspects of the disclosure include a device (e.g., a brake) used downhole to impart dynamic or static braking capabilities while absorbing or otherwise reducing shock loads. Examples discussed below include a brake for a downhole electromechanical linear actuator used to control a valve for the production of subterranean fluid. In some examples, it may be desirable for an electromechanical linear actuator to maintain a retracted position during certain safety and/or maintenance operations. In related examples, it may be desirable for an electromechanical linear actuator to fail in a retracted position. For example, if there is a disruption in the power supply to the electromechanical linear actuator, then it may be desirable for the electromechanical linear actuator to assume a retracted position. Alternatively, during normal operating activities, it may be desirable for the electromechanical linear actuator to maintain an extended position. As disclosed herein, the device which may be used, at least in part, to maintain the extended position of the electromechanical linear actuator may be referred to as a dynamically engageable electromechanical brake, or simply as a brake. In some examples, the brake may be used in conjunction with other equipment or devices to perform operations or tasks in a subsurface environment. In some examples, the subsurface environment may comprise a wellbore. The brake may additionally be used for braking purposes in equipment or devices located at the surface of the wellbore.

Numerous, non-limiting example embodiments are disclosed with various combinations of mechanical elements and other features. Elements which may be common to the example configurations of the brake as disclosed herein may comprise an electrical coil, a pair of cooperating armatures (e.g., an upper armature and a lower armature), and a spring. The brake is engaged by engaging the two armatures, such as by energizing the electrical coil to magnetize one of the armatures (e.g., the upper armature) to draw the other armature into engagement therewith. The magnetization may act on the lower armature to axially translate the lower armature in the direction of the upper armature such that an interface of the lower armature engages with an interface of the upper armature. At the time of engagement, the lower armature may be rotating at a speed congruous to that of a motor module, however, the lower armature may be rotating at a speed that is incongruous to the rotational speed of the upper armature. As such, a mechanical force may be exerted by the lower armature on the upper armature due to the discordant rotational speeds of the respective armatures. This may further create an undesirable mechanical force (e.g., a shock) upon the components of the brake. The spring component may allow for dampening of any shock or force incurred upon contact between the interfaces of the upper armature and the lower armature. By dampening the shock that occurs when the upper and lower armatures dynamically engage, the spring may reduce wear on the brake which may extend the functional life of both the brake and the components coupled to the brake such as the electromechanical linear actuator.

FIG. 1 is a section view of a well site in which an electromechanical linear actuator may be deployed according to aspects of this disclosure. While FIG. 1 generally depicts a well site 10 as being for land-based hydrocarbon production, the principles described herein are equally applicable to offshore or subsea production operations that employ floating or sea-based platforms and rigs, without departing from the scope of the disclosure. Well site 10 may include a drilling rig 12 arranged at the earth's surface 14 (e.g., surface 14) and a wellbore 16 extending therefrom and penetrating a subterranean earth formation 18. Wellbore 16 may be completed and ready for production or already producing in this example. A large support structure such as a derrick 20 is erected at the well site 10 on a support foundation or platform, such as a rig floor 22. In a subsea context, earth's surface 14 may alternatively represent the floor of a seabed, and rig floor 22 may be on the offshore platform or floating rig over the water above the seabed. Derrick 20 may be used to support equipment in constructing, completing, producing from, or servicing wellbore 16. Derrick 20 may be used, for example, to support and manipulate the axial position of a tubing string, a wireline, or other conveyance within wellbore 16. Such a conveyance may serve various functions, such as to lower and retrieve tools including subsurface safety valves ("SSSV"), to convey fluids from or to surface 14, and/or to support the communication of signals and power during wellbore operations.

Wellbore 16 may follow any given wellbore path extending from surface 14 to an end of wellbore 16, referred to as a toe 15 of wellbore 16. Wellbore 16 in this example includes a vertical section 16A extending from surface 14, followed by a horizontal section 16B passing through a production zone 29, and terminating at toe 15 of the wellbore 16. Portions of wellbore 16 may be reinforced with one or more tubular metal casings 24 cemented within wellbore 16. Production tubing 26 is installed inside wellbore 16, which serves as a fluid conduit for production fluid 31. In some examples, production fluid 31 may include any reservoir fluids including but not limited to hydrocarbons, connate water, brine water, and/or fresh water. Production fluid 31 may be produced from subterranean earth formation 18 to surface 14 by way of either production tubing 26, tubular metal casings 24, and/or wellhead 32. Production tubing 26 may be interior to tubular metal casings 24 such that an annulus 27 is formed between production tubing 26 and tubular metal casings 24. Packers 28 may be positioned in annulus 27 to direct the flow of production fluid 31 away from annulus 27 and towards the conduit formed by the inner surface of production tubing 26. As such, packers 28 may prevent flow into annulus 27. A production tree 30 may be positioned proximate a wellhead 32 to control the flow of the production fluid 31 out of the wellbore 16. In some examples, production tree 30 may contain one or more valves which may allow for regulation of the flow rate through production tree 30.

A subsurface flow control system 40 is schematically shown as deployed or in the process of being deployed in wellbore 16 above production zone 29 and below production tree 30. Subsurface flow control system 40 may include a subsurface safety valve ("SSSV") 50 interconnected with production tubing 26. An electromechanical linear actuator 60 may be used to selectively actuate the subsurface safety valve 50. As will be described further below, electromechanical linear actuator 60 may include a dynamically engageable electromechanical brake (e.g., "brake") 70. Although FIG. 1 may be directed to the use of an electromechanical linear actuator 60 for selectively controlling subsurface safety valve 50, electromechanical linear actuators may be used either at the surface or in the subsurface for a variety of operations related to hydrocarbon production. In some examples, electromechanical linear actuator 60 may be used with inflow control devices such as sliding sleeves, sliding doors, or choke valves. As depicted, electromechanical linear actuator 60, may be an integral subassembly of subsurface safety valve 50 in at least some implementations. Generally, the electromechanical linear actuator 60 may convert rotation of a motor to linear motion of an actuating member to function or manipulate a separate or integrated piece of wellbore equipment. For example, the linear extension of the actuator may maneuver subsurface safety valve 50 to an open position. In some examples, subsurface safety valve 50 may include a biasing member which preferentially maintains subsurface safety valve 50 in a default configuration or position unless an external force is applied. For example, it may be desirable for subsurface safety valve 50 to preferentially assume a closed configuration (e.g., to prevent flow). In further examples, electromechanical linear actuator 60 may be energized and may further assume an extended position such that subsurface safety valve 50 assumes an open configuration (e.g., to allow flow). In further examples, the extension of electromechanical linear actuator 60 may be extended against the biasing action of a biasing member disposed on or integral to subsurface safety valve 50. In some examples, the biasing member may be a spring. This can be accomplished by a variety of implementations, including but not limited to threaded members or a rack-and-pinion style mechanism.

As described in the foregoing, subsurface safety valve 50 may be used to shut off flow of production fluid 31 in response to a shut-in event. A shut-in event may be any emergency or other event that can merit shutting-in the well using subsurface flow control system 40 to stop the flow of production fluid 31. A shut-in event may be associated with, for example, a well failure, however it may also be associated with the execution of planned wellbore maintenance. Shutting-in the well in response to a shut-in event may help prevent uncontrolled flowing production fluid, which could otherwise cause explosions, damage to surface facilities, injuries to personnel, environmental damage, and/or prevent the performance of maintenance work. In some examples, subsurface safety valve 50 may be built into the tubing string (e.g., production tubing 26) as a tubing retrievable safety valve (TRSV). In other examples, subsurface safety valve 50 may be inserted into a receptacle in the tubing string as a wireline retrievable subsurface safety valve (WLRSV) which may also be known as an insert subsurface safety valve.

Figure 2:
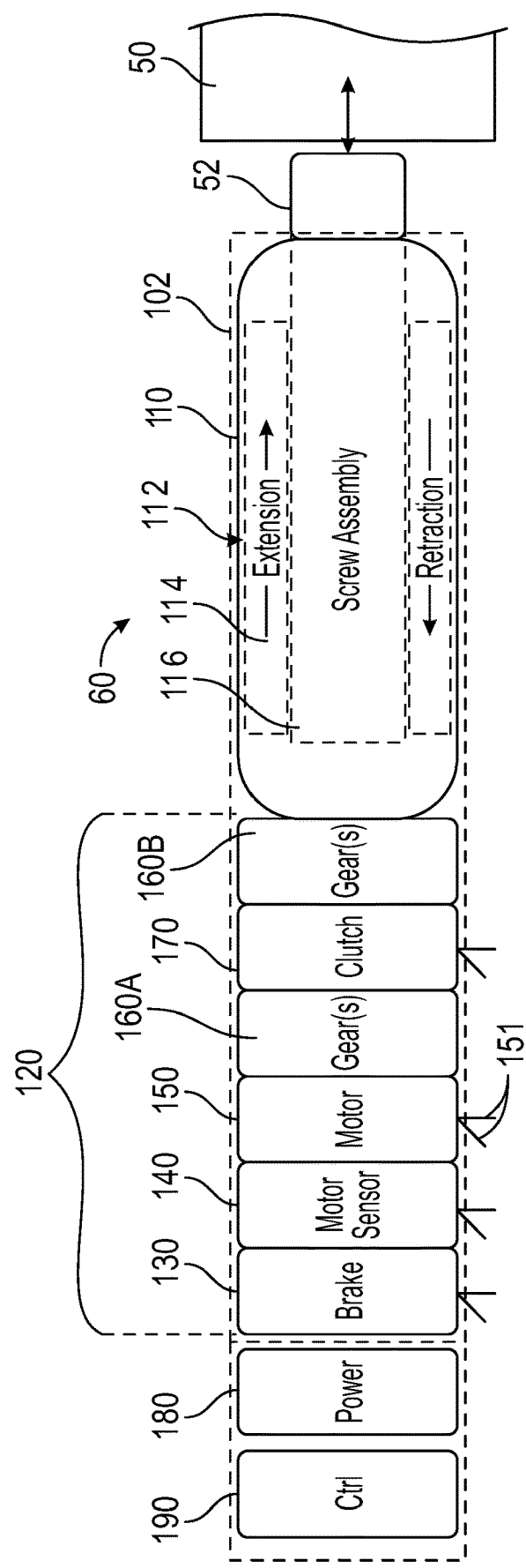
FIG. 2 is a schematic diagram of an electromechanical linear actuator according to an example configuration.

FIG. 2 may depict an example configuration of an electromechanical linear actuator 60 (e.g., referring to FIG. 1) comprising different combinations of modules. Each module may have different mechanical and/or electrical features to perform a particular function or set of related functions. The modules may be described in shorthand fashion herein by their functional description (without the use of the word "module"). The modules may be collectively used to construct different configurations of electromechanical linear actuators 60 (e.g., referring to FIG. 1). The modules may be modular at least in the sense that they may comprise independent units that can be combined to achieve different electromechanical linear actuator 60 (e.g. referring to FIG. 1) configurations. The modules may be preconfigured in the sense that their mechanical and/or electrical features may be specific to the respective module but are designed in a way that they are compatible with other modules and can therefore be combined and work together in the various configurations. Thus, a different selection of modules may achieve different desired results or performance specifications. This modularity may also allow for a module to be selectively removed, repaired, or replaced with an equivalent or different module. However, the disclosed aspects do not require a modular construction, and embodiments may include a system or device that perform the disclosed functions and combinations of functions without necessarily being structured as a combination of discrete modules. Thus, any given module in an example configuration may be substituted by a non-modular component performing that function to achieve an alternate configuration without departing from the scope of this disclosure.

FIG. 2 is a schematic diagram 200 of an example configuration of an electromechanical linear actuator 60 which includes a dynamically engageable electromechanical brake. Electromechanical linear actuator 60 may include a mechanical drive section 110 and an actuator control section 120 including various components. The components of electromechanical linear actuator 60 may be grouped together in an actuator housing 102, which may be integral with a housing of the subsurface safety valve ("SSSV") 50. In some examples, the actuator housing 102 may comprise a single or multiple interconnected housing sections, and with suitable connectors for incorporating electromechanical linear actuator 60 into a tool string or work string. In other examples electromechanical linear actuator 60 may be an integral subassembly of subsurface safety valve 50 (e.g., referring to FIG. 1) or other device to be actuated.

With continued reference to FIG. 2, the present example of the mechanical drive section 110 includes a threaded mechanism 112 to convert rotational output of a member to linear translation of a member. The threaded mechanism 112 may be of any suitable type to selectively at least extend an actuating member 52. In some examples, actuating member 52 may be extended to connect with a biased member. Threaded mechanism 112 may be capable of retracting the actuating member 52. The threaded mechanism 112 includes cooperating threaded members that are threadedly engaged to drive linear motion of one threaded member in response to relative rotation between the threaded members. In this example, a first threaded member is a cylindrical section 114 that has an internal thread that matches an external thread of the other threaded member, which comprises a threaded shaft 116. Actuating member 52 in this example may be shaft 116 or a portion of shaft 116, or another member engaged by shaft 116. Threaded mechanism 112 may comprise, for example, a ball screw, a roller screw, a lead screw, or other suitable screw mechanism. The screw mechanism can include single lead screws or multiple lead screws. If a multiple lead screw is used, the force and operational requirements may determine the number of leads.

The actuator control section 120 is coupled to the mechanical drive section 110 and includes a plurality of functional modules for powering and controlling operation of the mechanical drive section 110. The modules in this example include a brake module 130, a motor sensor module 140, a motor module 150, two gearing modules 160A, 160B each comprising its own gear set, and a clutch module 170 that cooperate to control mechanical drive mechanism 110. While the foregoing may provide one example of the modules which may be included in an electromechanical actuator, electromechanical actuators do not necessarily require or include all of the listed modules and may further include additional modules which are not listed. As will be described in further detail below, brake module 130 may further comprise a dynamically engageable electromechanical brake (e.g., a brake). The brake may allow for electromechanical linear actuator 60 to maintain an extended position without requiring that motor module 150 perform continuous work to hold electromechanical linear actuator 60 in the extended position. Optionally, power and/or control signals may be sent from surface via the completion system at the well site. Alternatively, electromechanical linear actuator 60 may be a self-contained system, which may further include a downhole power module 180 (e.g., battery) and control module 190 with control logic for controlling operation of electromechanical linear actuator 60. These various modules optionally include their own module housings and may be grouped together in an actuator housing 102, together or separate from a housing of the mechanical drive mechanism 110. The modules may be in electrical communication with each other or at least specific other modules in the optionally modular actuator control section 120 and/or with a surface (above-ground) information handling system (not expressly shown).

Motor module 150 may electrically power the movement of the mechanical drive mechanism 110, e.g., rotation of the screw assembly. Motor module 150 may include one or more sets of electrical wires 151 for providing electrical power from an electrical power source (e.g., a power module) and any control signals to motor module 150, such as ON/OFF, RPM, and other motor parameters. Example motor options include stepper motors, brushed motors, or brushless direct current (BLDC) motors. A BLDC can also be known as a servo motor. The term brushless direct current may be used herein to describe any motor that is not a stepper motor or a brushed motor. These motors typically use a DC voltage, but an AC motor can be substituted for the DC motor.

A motor sensor module 140 is optionally included with electromechanical linear actuator 60 for providing positional feedback (e.g., angular position information) regarding the motor or motor shaft thereof. These devices may comprise resolvers (aka field director) and Hall effects sensors, which may be known by other names. Typically, a brushless direct current motor works best with motor sensor, but can operate without one. A stepper motor typically does not require a separate motor sensor.

Motor sensor module 140 may provide a positional signal back to the motor module 150 itself or to the control module 190 or a surface controller, such as to ensure the motor module 150 is rotating in the intended direction, to determine or control an angular velocity or position of the motor module 150, or other parameters. The motor module 150 in any given configuration may be coupled, directly or indirectly, to the mechanical drive section 110 to urge the subsurface safety valve 50 to the open position. Other modules may be coupled between the motor module 150 and the mechanical drive section 110, such as the gearing modules 160 and clutch module 170 in FIG. 2.

In the example of FIG. 2, the gearing modules 160A, 160B are coupled between the motor module 150 and the mechanical drive section 110 using the respective gear sets to convert rotational motion from the motor module 150 as output to an input to the drive mechanism 110, such as to provide a desired speed, RPM, torque, or power, and/or mechanical advantage. The gearing can include a single-stage or multi-stage gearbox or a multistage gearbox. For most single-stage gearboxes, the directions of rotation of the input and output shafts are opposite, while for two-stage gearboxes, the additional change in direction by the second stage puts the output shaft rotation the same as the input shaft. In the case of a multistage gearbox, the stages can split, e.g., a gearbox with 3 total stages which has a 1-stage gearbox and a 2-stage gearbox or even three 1-stage gearboxes. The gearbox(es) may be located anywhere in the electromechanical linear actuator 60 where they are needed. For example, a preferred actuator would have a 1-stage gearbox between the screw assembly (mechanical drive mechanism 110) and the clutch module 170 along with a multi-stage gearbox between the clutch module 170 and motor module 150.

The clutch module 170 is provided to couple and selectively decouple the motor module 150 of the actuator control section 120 from the mechanical drive section 110. The clutch is typically a normally open device, i.e., one that opens or disengages when power is removed. When power is removed from the clutch module 170, the clutch module 170 disengages, allowing the subsurface safety valve 50 to close. The clutch module 170 contributes to the failsafe design, whereby a loss of power to the motor module 150 or to the actuator control section 120 generally allows the subsurface safety valve 50 to close. The clutch can be any of a variety of clutch types, including but not limited to a friction device, a geared device (e.g., has a gear profile that engages and disengages), a solenoid type device that latches and unlatches. Although a normally-open configuration is generally preferred, if power is available when the subsurface safety valve needs to go closed, a normally closed device can instead be used.

The brake module 130 is optionally included to help the actuator control section 120 maintain the subsurface safety valve 50 in the open condition. The subsurface safety valve 50 includes a spring or other biasing member that biases the valve closure member to a closed position. This biasing member exerts a force against the actuator whenever the actuator is extended. The motor module 150 provides some resistance to motion. However, there is a risk when the electromechanical linear actuator 60 is extended and the motor module 150 is turned off that the spring will cause the subsurface safety valve 50 to slowly close. This is typically called creep closure due to the slow nature of the closure. The motor module 150 could be actively powered to maintain the subsurface safety valve 50 in the open condition. However, doing so can consume excess electrical power and/or decrease the life of the motor module 150. Instead, the brake module 130 can be used to hold the actuating member 52 in the extended position in order to keep the subsurface safety valve 50 open and prevent creep closure. The brake module 130 is preferably a normally open configuration, meaning that the brake module 130 can be powered to hold the actuating member 52 open and released in the event of a power loss (so as to prevent interfering with closure of the subsurface safety valve 50). Alternatively, the brake module 130 could have a normally closed configuration, which may default to holding the subsurface safety valve 50 open, as a separate or redundant power supply to another power supply whose power loss would trigger a shut-in.

The power module 180 may comprise a battery or other electromotive source for powering the components of the actuator control section 120 or any converting surface provided power, e.g. converting a surface provided voltage to a different voltage, for example. The control module 190 may include one or more processors, memory, digital or analog inputs/outputs, etc., in communication with one or more of the modules in the actuator control section 120, such as along a bus. The control module may also include control logic executable by the processor for controlling operation of the actuator control section 120 or the various modules and other components thereof. In this example, the electromechanical linear actuator 60 is a self-contained unit with the on-board power module 180 and control module 190. However, other embodiments may include power and/or control signals from surface, either alone or in combination with an on-board power module and/or control module.

Figure 3:
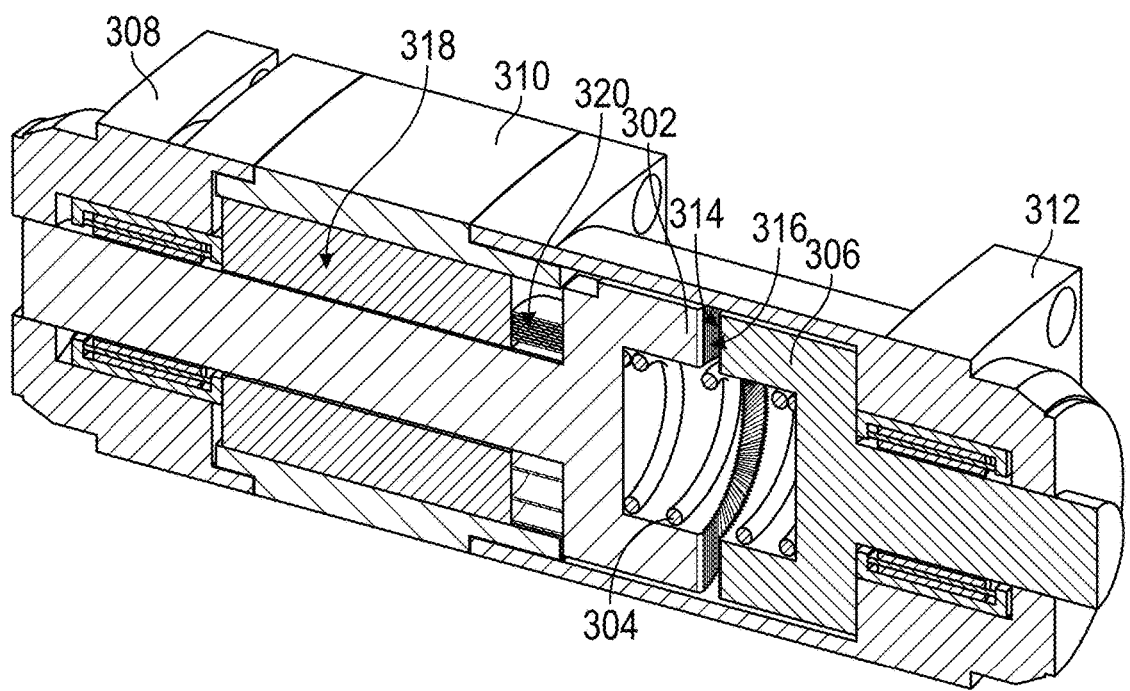
FIG. 3 is a section view of a brake for an electromechanical linear actuator.

FIG. 3 is a perspective view of an example configuration of a dynamically engageable electromechanical brake (e.g., a brake) 300 for use with electromechanical linear actuator 60 (e.g., referring to FIG. 1). Brake 300 may include a first armature 302 axially spaced from a second armature 306. A biasing element 304 is disposed therebetween, embodied by way of example as a coil spring in this figure, such that the second armature 306 is biased with respect to (in this case, axially away from) the first armature 302. The terms "first" and "second" are used to identify specific armatures in this embodiment without necessarily being limiting to other embodiments in terms of which of the two armatures has which features. Furthermore, due to the orientation in which brake 300 may be utilized in a wellbore in this embodiment (e.g., toward an uphole direction of a wellbore in which it is disposed), the first armature 302 may be more specifically referred to as an upper armature while the second armature 306 may be downhole of the upper armature or first armature 302 and referred to as a lower armature.

As previously noted, brake 300 may be integrated with or adjacent to the electromechanical linear actuator 60 (e.g., referring to FIG. 1) such that second armature 306 may rotate with motor module 150 (e.g., referring to FIG. 2). In some examples, motor module 150 (e.g., referring to FIG. 2) may be axially spaced from brake 300 such that second armature 306 is disposed between the motor module 150 (e.g., referring to FIG. 2) and the first armature 302. In some examples, first armature 302 may be confined by an upper housing 308 such that any axial translation first armature 302 in upper housing 308 is limited. Additionally, a portion of first armature 302 may be contained within a middle housing 310 where upper housing 308 is disposed axially adjacent to middle housing 310. Second armature 306 may be at least partially contained within a lower housing 312. Additionally, second armature 306 may not be affixed to lower housing 312 such that second armature 306 may translate along the axial direction of brake 300. However, the translation of second armature 306 may be restricted in the axial direction away from first armature 302 by lower housing 312. In the foregoing embodiment, first armature 302 may be restricted from axial translation while second armature 306 may translate axially, however in alternative configurations the opposite may be true. For example, first armature 302 may be able to translate axially while second armature 306 may be restricted from axial translation. In further examples, both first armature 302 and second armature 306 may be to axially translate such that neither armature is exclusively restricted from axial movement. In some examples, upper housing 308, middle housing 310, and lower housing 312 may be referred to, either separately or in combination, as "the brake housing."

Engaging the braking functionality of brake 300 may involve axial engagement of second armature 306 with first armature 302. The axial engagement may further involve interfacial engagement of a contacting surface 314 of second armature 306 with a contacting surface 316 of first armature 302. In some examples, contacting surface 314 and contacting surface 316 of the first and second armature, respectively, may be referred to as braking surfaces. In some examples, the respective contacting surfaces (e.g., braking surfaces) may include textured surfaces, crown gears, bevel gears, or one or more friction plates. Prior to engagement of brake 300, biasing element 304 may prevent contact between second armature 306 and first armature 302. Brake 300 may be engaged by the energization of electrical coil 318 which may magnetize first armature 302 resulting in an attractive magnetic force which may promote translation of second armature 306 into engagement with first armature 302, whereby their respective contacting surfaces 314, 316, or braking surfaces, are engaged. Electrical coil 318 is disposed about, and optionally concentric with, the first armature 302 such that first armature 302 is magnetizable by the energization of electrical coil 312 to magnetically attract the second armature 306. In order for second armature 306 and first armature 302 to come into axial engagement, the attractive magnetic force provided at least in part by the energization of electrical coil 318 may overcome the repulsive force exerted between second armature 306 and first armature 302 by biasing element 304.

At the time of engagement, second armature 306 may be rotating at a speed congruous to that of motor module 150 (e.g., referring to FIG. 2), however, second armature 306 may either not be rotating or may be rotating at a speed that is incongruous to the rotational speed of upper armature or first armature 302. As such, both first armature 302 and second armature 306 may be rotatably disposed within the brake housing. As such, a mechanical force may be exerted upon contact by second armature 306 on first armature 302 due to the discordant rotational speeds of the respective armatures. This may further create an undesirable mechanical force (e.g., a shock) upon the components of brake 300. A dampening element, such as a rotational spring 320 may allow for dampening of any shock or force incurred upon contact between contacting surface 314 of second armature 306 and contacting surface 316 of first armature 302. By dampening the shock that occurs when first armature 302 and second armature 306 dynamically engage, rotational spring 320 may reduce wear on brake 300 which may extend the functional life of both brake 300 and associated electromechanical linear actuator 60 (e.g., referring to FIG. 1). In addition to shock absorption, rotational spring 320 may bias first armature 302 to a neutral rotational position. As such, rotational spring 320 may reduce the angle of rotation with first armature 302 and may rotate by biasing first armature 302 to a neutral rotational position. Rotational spring 320 may include any type of spring element including but not limited to a rotor spring, a wrap spring, a torsion spring, or a combination thereof. In some examples, more than one rotational spring 320 may be utilized to provide increased shock absorption and limit the rotation imparted on first armature 302. It should be noted that the ability of brake 300 to function for dynamic braking purposes does not preclude the ability of brake 300 to function for static braking purposes. Additionally, while second armature 306 may rotate with motor module 150, and first armature 302 may rotate when it engages with second armature 306, the brake housing (e.g., upper housing 308, middle housing 310, and lower housing 312) does not rotate with the respective armatures. Rather, the components of the brake housing are stationary. In alternative examples, it may be that upper armature or first armature 302 may rotate synchronously with motor module 150 while lower armature 306 may either be stationary or may rotate at a speed that is incongruous to the rotational speed of upper armature or first armature 302. In further examples, both lower armature or first armature 302 and upper armature or second armature 306 may be rotating synchronously with separate motor modules 150 (e.g., two or more different motor modules) where the motor modules may be rotating either synchronously or discordant with each other.

Various examples of rotational limiters (i.e., rotation-limiting elements) are disclosed herein to limit how far the first armature may rotate when absorbing shock from engagement with the second armature. Such rotational limiters are useful, for example, to reduce the likelihood of hysteresis and/or backlash. In some configurations, the rotational spring itself may limit how far the first armature may rotate. That is, the rotational spring may have a predefined range of travel to provide the limited rotation of the first armature relative to the brake housing. Another example of a rotational limiter broadly includes a tab on the first armature or the brake housing and a shoulder on the other of the first armature or the brake housing positioned to interfere with the tab. The tab is circumferentially spaced from the shoulder when the first armature is in the neutral rotational position, so rotation of the first armature would stop when the tab reaches the shoulder, even when the rotational spring itself would not have prevented further rotation. In a more specific example, the rotational limiter may comprise an arcuate channel defining the shoulder at one end, wherein the tab projects into the arcuate channel. In some examples, any of these or other rotational limiters, may be included in brake 300, in any combination.

Figure 4:
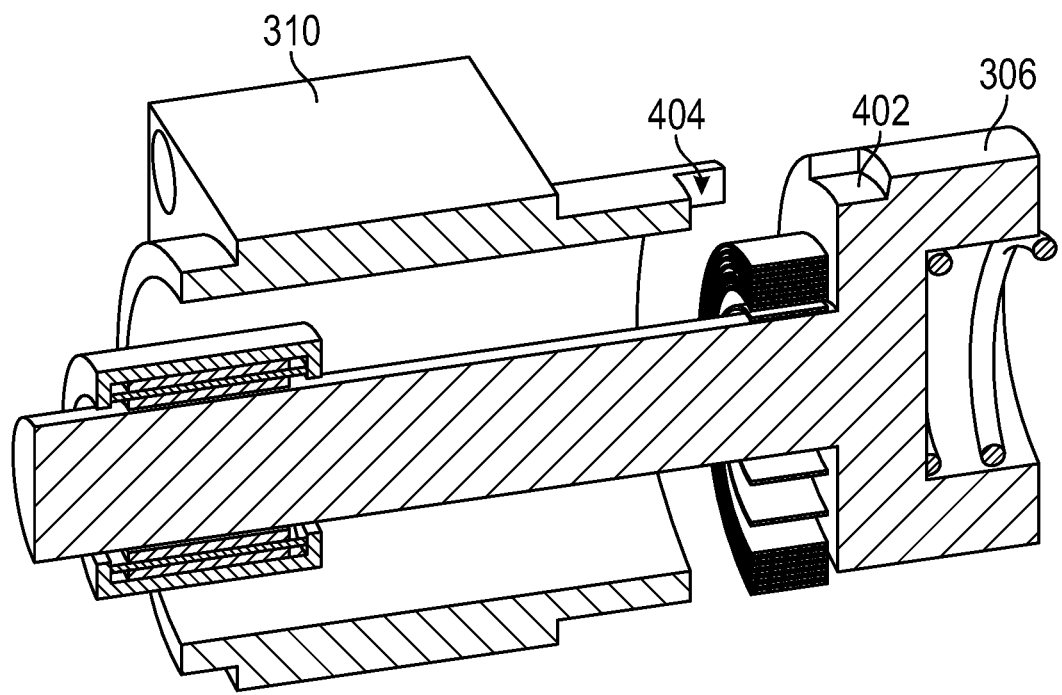
FIG. 4 is an exploded view of a portion of a brake for an electromechanical linear actuator.

FIG. 4 depicts an exploded view 400 of a portion of a brake for an electromechanical linear actuator including middle housing 310 and first armature. As depicted, the body of first armature may include a rotation-restricting groove 402 in which a rotation-restricting tab 404 may oscillate. Rotation-resisting groove 402 may further be described as an arcuate channel. The combination of rotation-restricting groove 402 and rotation-restricting tab 404 are an example of what may be referred to as a rotational limiter. Specifically, rotation-restricting tab 404 may oscillate through the rotational distance defined by the end portions of rotation-restricting groove 402. For example, rotation-restricting tab 404 may only rotate so far in a single direction as to hit one end of rotation-restricting groove 402 before rebounding. Upon rebounding, rotation-restricting tab 404 may only travel so far as to hit the other end of rotation-restricting groove 402. The two end surfaces upon which rotation-restricting tab 404 may impact rotation-restricting groove 402 may include a dampening element or coating. In some examples, the dampening coating may include a viscoelastic coating such as a rubber. In other examples, the dampening element may include a spring. As depicted, rotation-restricting tab 404 may be integral to the body of middle housing 310. In some examples, rotation-restricting groove 402 may be integral to the body of middle housing 310 while rotation-restricting tab may be integral to the body of first armature. The angle of rotation provided by the foregoing rotation-limiting elements may depend on the circumferential length of rotation-restricting groove 402.

Figure 5:
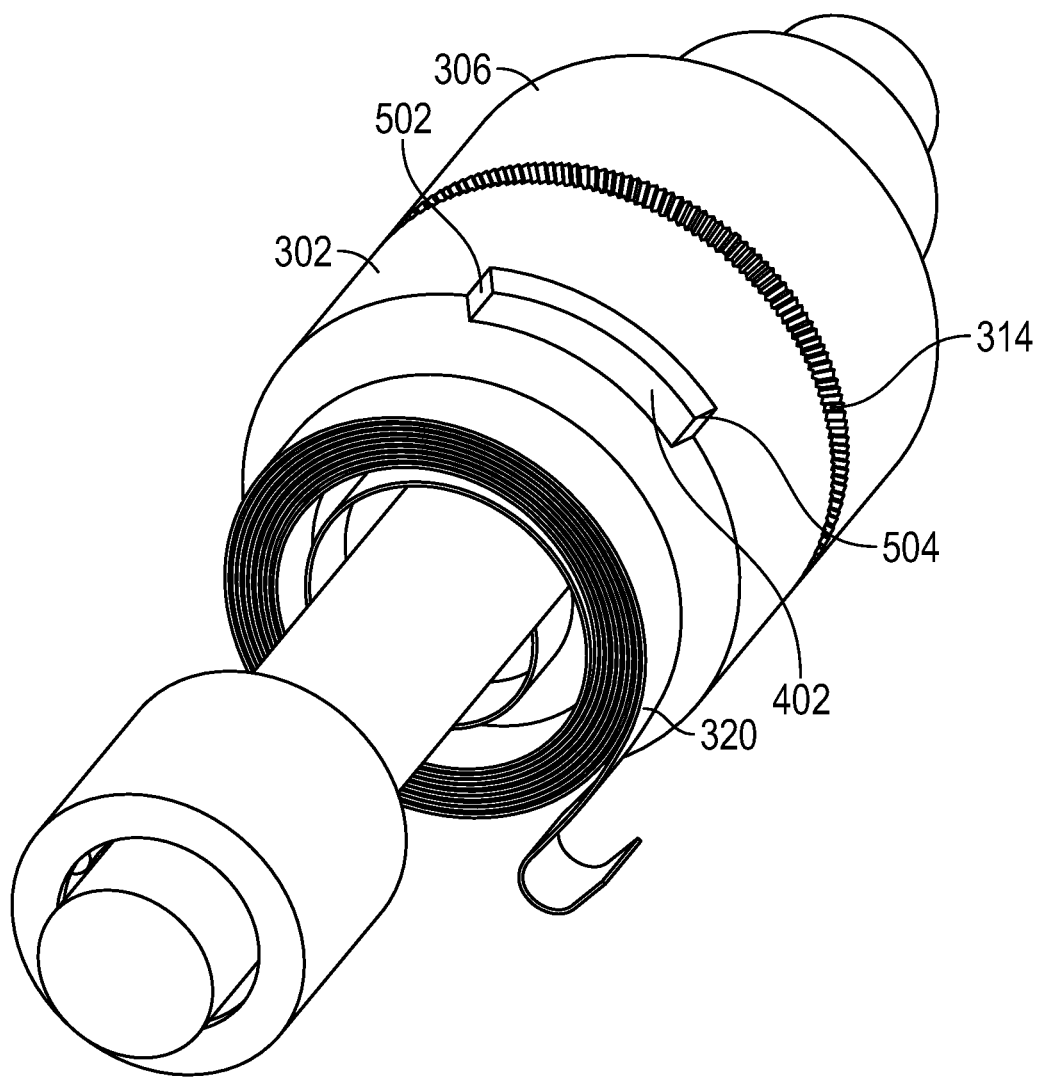
FIG. 5 is a perspective view of a portion of a brake for an electromechanical linear actuator including a rotor spring.

FIG. 5 depicts a perspective view 500 of a portion of a brake for an electromechanical linear actuator 60 (e.g., referring to FIG. 1) including first armature 302 and second armature 306. Contacting surface 314 of second armature 306 is exposed to display a crown gear. As previously mentioned, the faces of both first armature 302 and second armature 306 may include texture surfaces, crown gears, bevel gears, and/or friction plates. Additionally exposed is rotation restricting groove 402, in which rotation-restricting tab 404 (not shown in FIG. 5) may travel. As depicted, rotation-restricting groove 402 includes a first rotation-restricting boundary 502 and a second rotation-restricting boundary 504. In some examples, rotation-restricting boundary 502 and a second rotation-restricting boundary 504 may be referred to as shoulders. As previously stated, the combination of rotation-restricting groove 402 and rotation-restricting tab 404 are an example of what may be referred to as a rotational limiter. After the engagement of contacting surface 314 of second armature 306 and contacting surface of first armature 302, the rotation of second armature 306 may be relayed to first armature 302. The rotation of first armature 302 may be dampened by rotational spring 320. As depicted, rotational spring 320 may include one or more rotor springs, however rotational spring 320 may additionally include one or more wrap springs. The level to which the rotation is restricted or dampened may be controlled by how tightly rotational spring 320 is wound. In some examples, first armature 302 may additionally include rotation-restricting groove 402 to further restrict the distance through which first armature 302 may rotate. As previously described, rotation-restricting tab 404 (not depicted) may travel within rotation-restricting groove 402; however, the travel of rotation-restricting tab 404 (not depicted) will be limited by first rotation-restricting boundary 502 (e.g., shoulder) and second rotation-restricting boundary 504 (e.g., shoulder).

Figure 6:
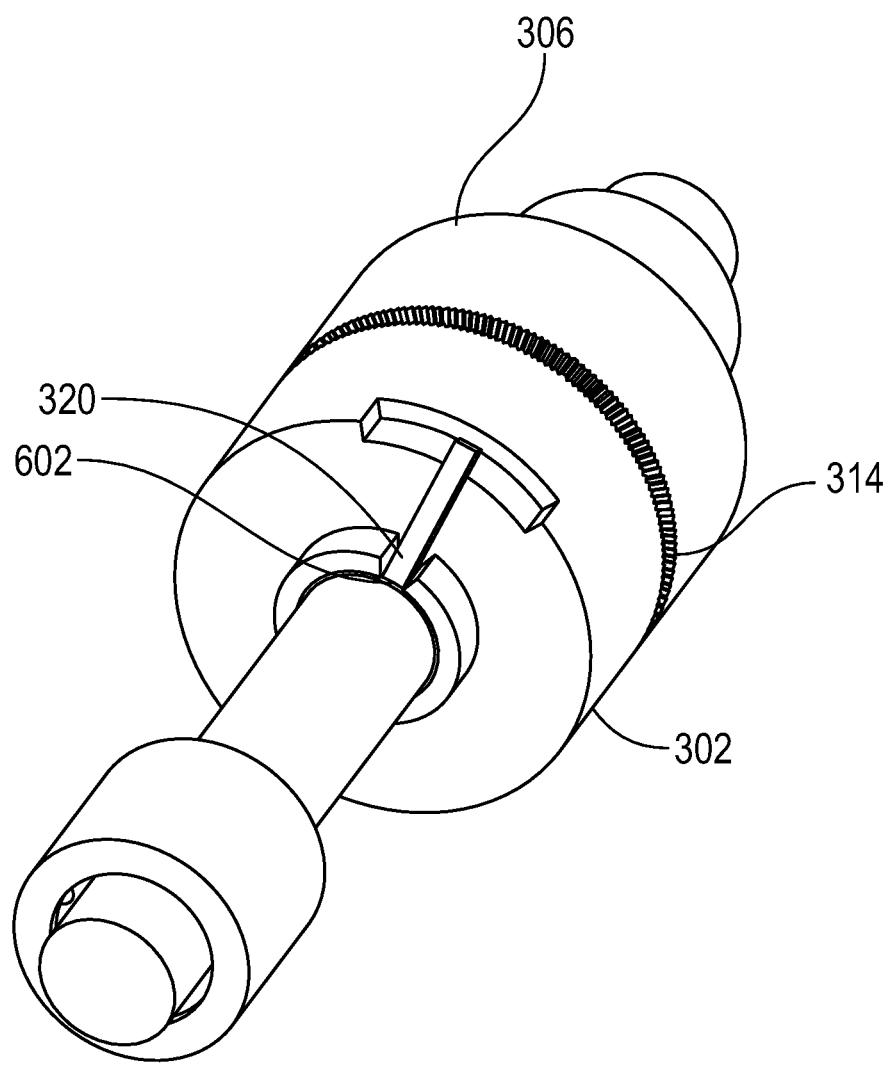
FIG. 6 is a perspective view of a portion of a brake for an electromechanical linear actuator including a torsion bar.

FIG. 6 depicts another perspective view 600 of a portion of a brake for an electromechanical linear actuator 60 (e.g., referring to FIG. 1) including first armature 302 and second armature 306. As depicted, rotational spring 320 may include a spiral torsion spring, straight torsion spring, flexible rods, or cantilever beam to restrict rotational motion of first armature 302. In some examples, the shape of the cantilever beam may be straight, arcuate, or include bends within the body of the cantilever beam. One end of rotational spring 320 may be disposed in a spring pocket 602 which may be further disposed on first armature 302. After the engagement of contacting surface 314 of second armature 306 and contacting surface of first armature 302, the rotation of second armature 306 may be relayed to first armature 302. The rotation of first armature 302 may be dampened by rotational spring 320, the movement of which may be restricted by spring pocket 602. In some examples, rotational spring 320 may not be able to break free from spring pocket 602.

Figure 7:
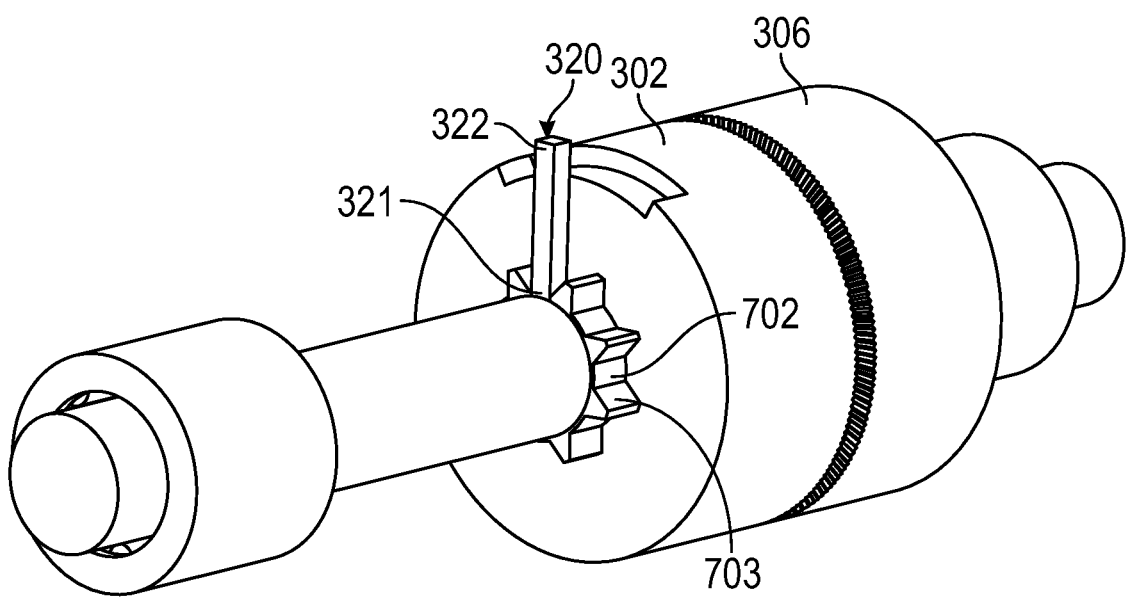
FIG. 7 is another perspective view of a portion of a brake for an electromechanical linear actuator including a torsion bar.

FIG. 7 depicts another perspective view 700 of a portion of a brake for electromechanical linear actuator 60 (e.g., referring to FIG. 1) including first armature 302 and second armature 306. As depicted, rotational spring 320 may include at least one torsion spring, at least a portion of which is embodied here as a radially-extending cantilever beam, to restrict rotational motion of first armature 302. In some examples, the shape of the cantilever beam may be straight, arcuate, or include bends within the body of the cantilever beam. A first end 321 of rotational spring 320 may be captured in one of a plurality of spring pockets 702 circumferentially arranged about a shaft of the first armature 302. A second end 322 of the rotational spring 320 may be engaged with a housing or some other feature that the first armature 302 will rotate with respect to. The spring pockets 702 may functionally comprise stops by virtue of capturing the first end 321 of the rotational spring. Upon axial engagement of the first armature 302 with the second armature 306 and contact between their respective contacting surfaces, the rotation of the second armature 306 may be relayed to first armature 302, with some of the rotational energy of the second armature 306 being transferred to the first armature 302 against the biasing action of the rotational spring 320 (e.g., flexing of a cantilevered beam portion). The rotation of first armature 302 may be dampened by rotational spring 320, the movement of which may be restricted by one of a plurality of spring pockets 702. The plurality of spring pockets 702 may include one or more ramped surfaces 703 which may further define a portion of the shape of the spring pocket 702. In this example, each spring pocket 702 comprises a pair of opposing ramped surfaces 703. The ramped surfaces 703 provide some freedom for the beam portion of the rotational spring 320 to pivot circumferentially while one end remains captured in the spring pocket 702. The spring pockets 702 function as stops, such that normally rotational spring 320 may not be able to break free from its current spring pocket 702. However, in some examples, if a sufficient (threshold level) of torque is imparted to the first armature 302, the first end 321 of the rotational spring 320 may slide along one of the ramped surfaces 703 of the current spring pocket 702 into an adjacent one of the spring pockets.

Figure 8:
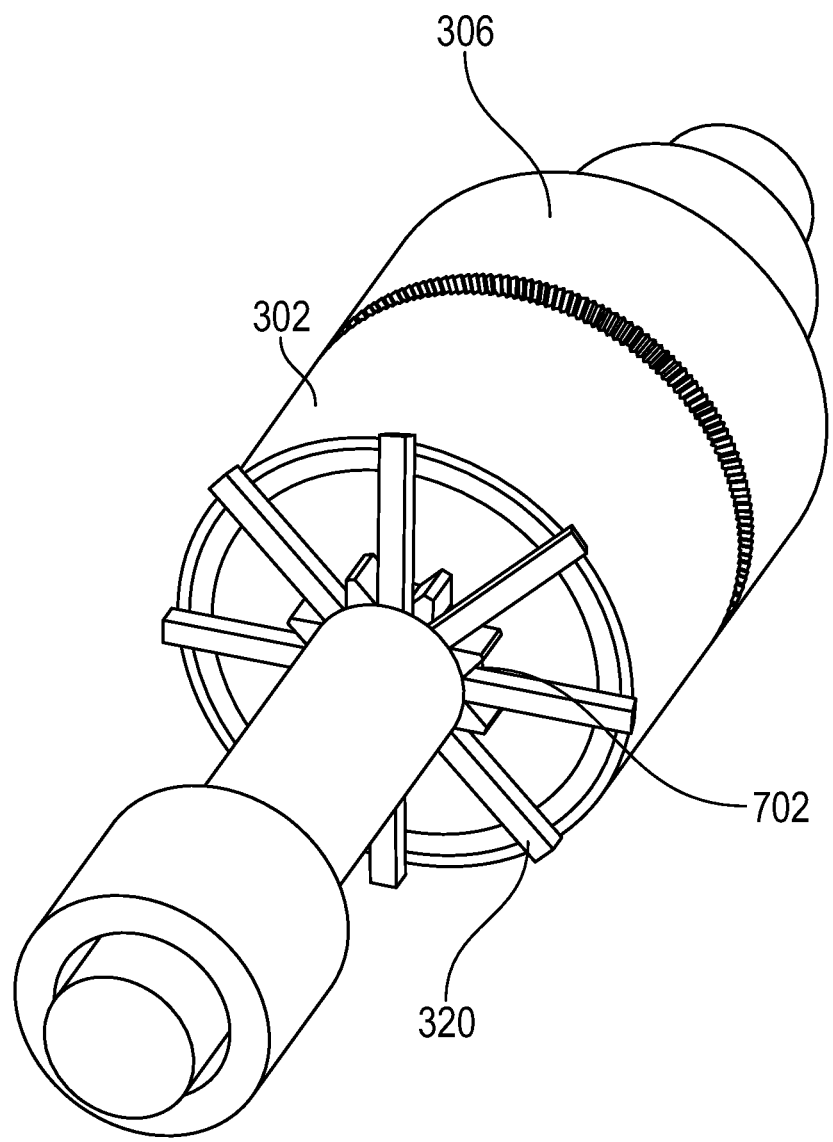
FIG. 8 is a perspective view of a portion of a brake for an electromechanical linear actuator including a plurality of torsion bars.

FIG. 8 depicts another perspective view 800 of a portion of a brake for electromechanical linear actuator 60 (e.g., referring to FIG. 1) including first armature 302 and second armature 306. As depicted, rotational spring 320 may include a plurality of torsion springs or cantilever beams to restrict rotational motion of first armature 302. One end of the one or more rotational springs 320 may be disposed in one of a plurality of spring pockets 702 which may be further disposed on first armature 302. After the engagement of contacting surface 314 of second armature 306 and contacting surface of first armature 302, the rotation of second armature 306 may be relayed to first armature 302. The rotation of first armature 302 may be dampened by one or more rotational springs 320, the movement of which may be restricted by one of a plurality of spring pockets 702. The plurality of spring pockets 702 may include one or more ramped surfaces which may further define a portion of the shape of spring pocket 702. In some examples, a portion of rotational spring 320 may slide along the one or more ramped surfaces of spring pocket 702. In some examples, one or more rotational springs 320 may not be able to break free from spring pocket 702; however, one or more rotational springs 320 may additionally be able to skip between notches if enough rotational force is available. FIG. 8 may depict a rotational spring 320 which corresponds with each spring pocket 702; however, any ratio of springs-to-spring pockets may exist. In some examples, there may be more spring pockets than there are springs.

Figure 9:
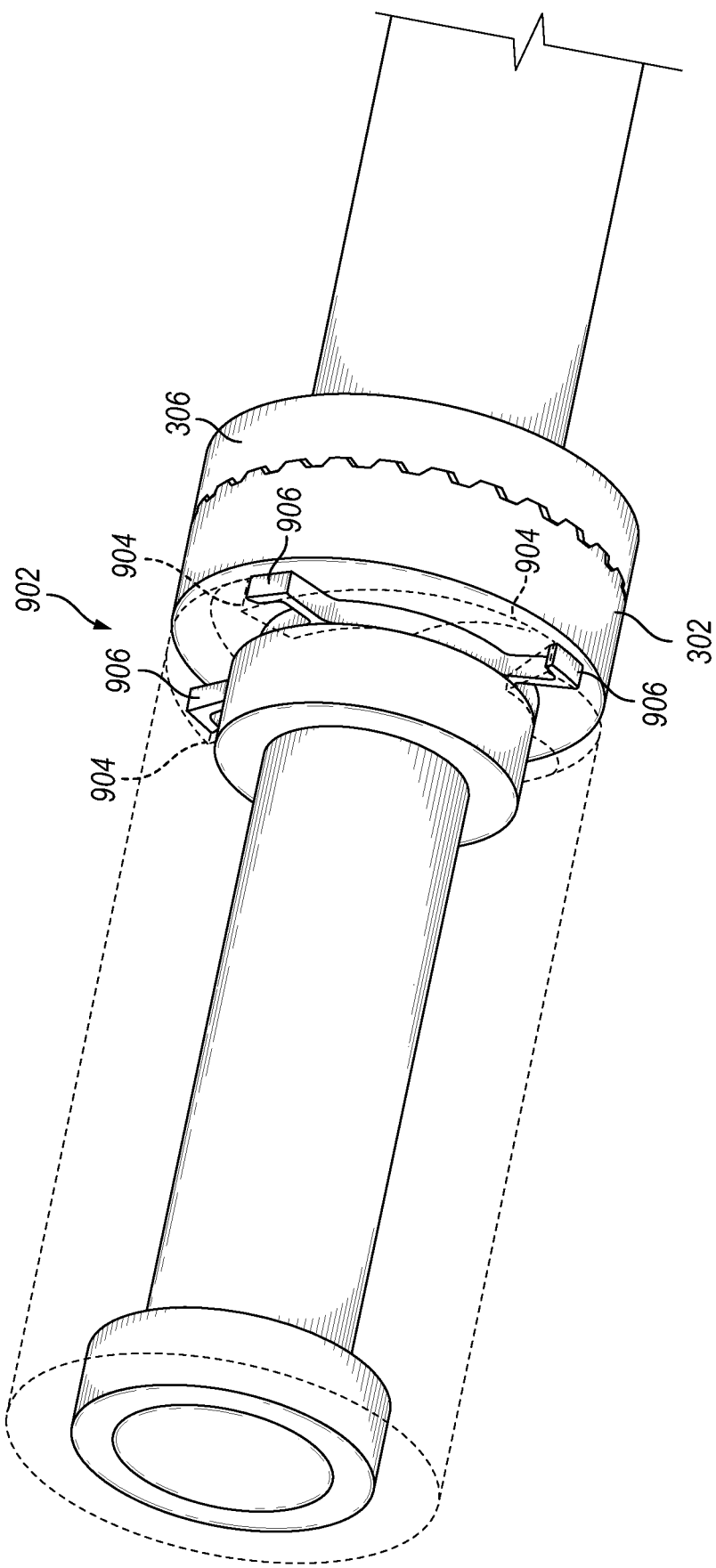
FIG. 9 is a perspective view of a portion of a brake for an electromechanical linear actuator including an anti-rotational ratcheting assembly.

FIG. 9 depicts another perspective view 900 of a portion of a brake for electromechanical linear actuator 60 (e.g., referring to FIG. 1) including first armature 302 and second armature 306. Instead of a rotational spring, as depicted in the previous figures, FIG. 9 includes anti-rotational ratcheting assembly 902 which includes ratchet gear 904 and a ratchet paw 906. Anti-rotational ratcheting assembly 902 may allow for free rotation in a first direction; however, rotation in a second direction may cause anti-rotational ratcheting assembly 902 to engage to restrict rotation in the second direction. In some examples, the second direction is opposite to the first direction. For example, if the first direction includes rotation in the clockwise direction, then the second direction may include rotation in the counterclockwise direction. After the engagement of contacting surface of second armature 306 and contacting surface of first armature 302, the rotation of second armature 306 may be relayed to first armature 302. The rotation of first armature 302, which may be in the restricted direction, may be dampened by one or more ratchet paws 906 which may engage with ratchet gear 904 (in dash line).

Figure 10:
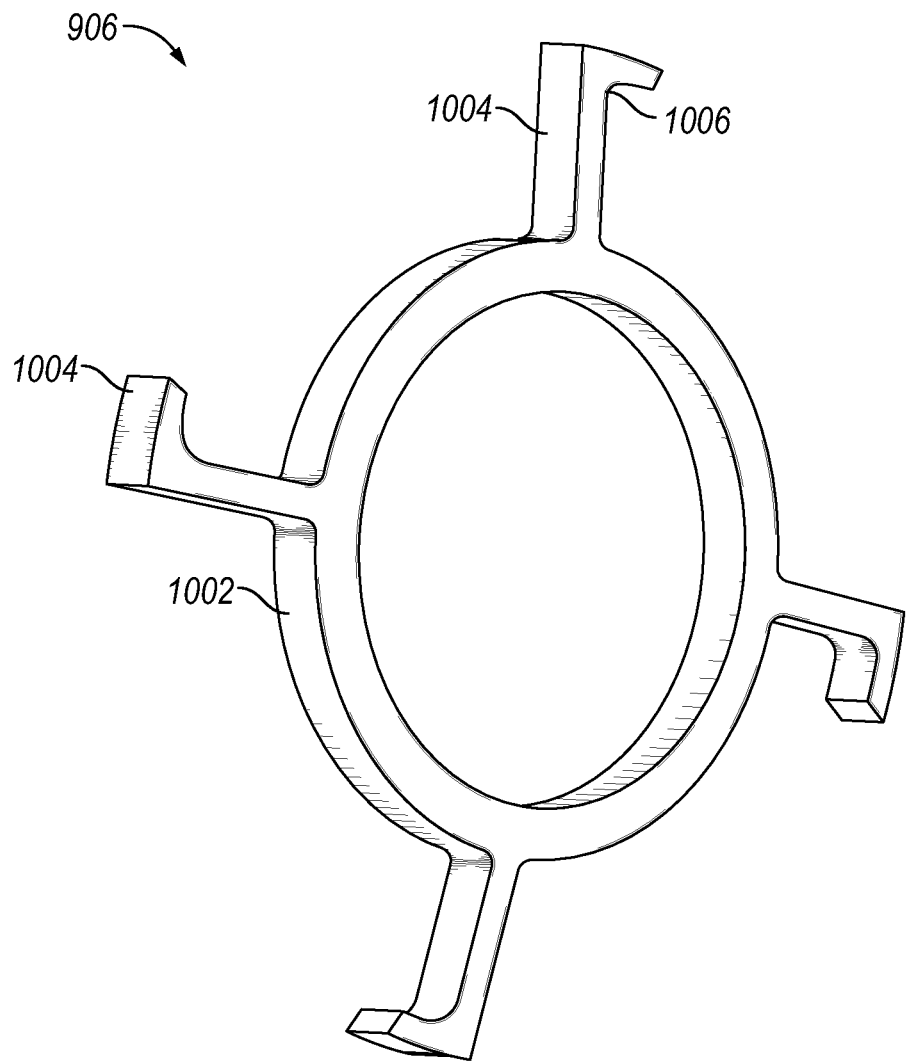
FIG. 10 depicts another perspective of ratchet paws according to an embodiment of the present disclosure.

FIG. 10 depicts another perspective of ratchet paws 906 according to an embodiment of the present disclosure. Ratchet paw 906 has a circle section 1002 and four l-shape sections 1004 located perpendicular to the outside of circle section 1002. The l-shaped sections 1004 each includes an inside surface 1006, which may be a rounded section or a section with a 90° angle. However, alternative angles may also be suitable. In addition, while FIG. 10 illustrates four of the l-shaped sections 1004, ratchet paws 906 may include more or less than four of the l-shaped sections 1004. Ratchet paw 906 can be of any dimensions that fit into an electromechanical brake housing and more specifically into anti-rotational ratcheting assembly 902 (referring to FIG. 9) which includes ratchet gear 904 (in dash line in FIG. 9) and ratchet paw 906. Ratchet paw 906 may be made of any material with an internal diameter that fits outside diameter of cylinder 908 (referring to FIG. 9). Further, the outside diameter of ratchet paw 906 can vary depending upon the material chosen so that ratchet paw 906 is thick enough to sustain the torque needed for the electromechanical brake to perform according to the requirements downhole. The four l-shape segments 1004 of ratchet paw 906 may be dimensioned to fit ratchet gear 904 and thick enough for the material to sustain the torque needed for anti-rotational ratcheting assembly 902 to perform according to the requirements downhole as well. The material may be any steel or alloy or polymer or any combinations thereof capable of providing the strength, young modulus, and chemical resistance, for example, to perform according to the requirements downhole. The four l-shape segments 1004 of ratchet paw 906 engage with ratchet gear 904.

Figure 11:
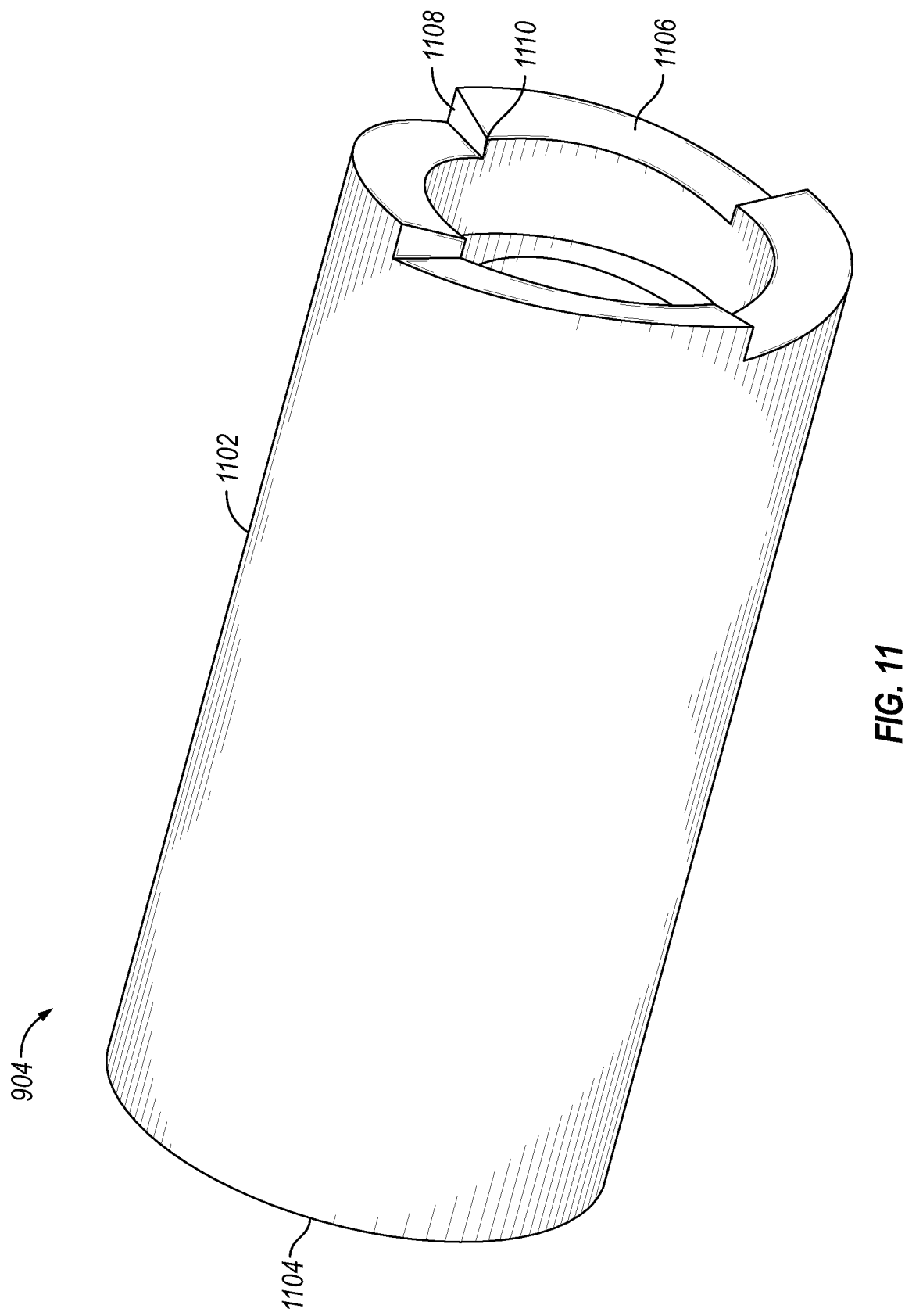
FIG. 11 shows one or more profiles of ratchet gear according to an embodiment of the present disclosure.

FIG. 11 shows one or more profiles of ratchet gear 904 according to an embodiment of the present disclosure. Ratchet gear 904 can be of any dimensions that fits into an electromechanical brake housing and fits with ratchet paw 906. Ratchet gear 904 and ratchet paw 906 may be made of any compatible material including any steel, alloy, polymer, or any combination thereof. Ratchet gear 904 may be a cylinder 1102 with two ends 1104 and 1106 with different shapes. The internal diameter of the two ends 1104 and 1106 may be different or equal. For instance, the internal diameter 1104 of the end of cylinder 1102 without ratchet paw 906 may be bigger than the internal diameter 1106 of the end of cylinder 1102 that fits ratchet paw 906 or vice versa. Similarly, the outside diameter of the two ends of the cylinder may be different or the same. The internal diameter 1106 of the end of cylinder 1102 of ratchet gear 904 that hosts ratchet paw 906 may be bigger than the external diameter of rachet paw 906 to fit without any gap so that the external diameter of circle 1002 of ratchet paw 906 is in contact with internal diameter of the end 1106 of cylinder 1102 of ratchet gear 904. Further, the end 1106 of cylinder 1102 of ratchet gear 904 that is in contact with ratchet paw 906 has four edges cut to fit the four l-shape segments 1004 of ratchet paw 906 so that the inside of the l-shape segments 1004 (including 1006) are in contact with the end 1108 of cylinder 1102 of ratchet gear 904. While FIG. 11 illustrates four edges cut in the end 1106 of cylinder 1102, it should be understood that the end 1106 may have more or less than four edges as desired for a particular application, for example, to correspond with the number of the l-shaped segments 1004. The shapes 1108 of the end of cylinder 1102 of ratchet gear 904 that fit the internal of l-shape segments 1004 may be symmetric (forming four rectangles not shown) or side 1110 that will be in contact with internal side 1006 of l-shape segments 1004 is shorter than side 1108.

Accordingly, the present disclosure may provide an electromechanical linear actuator for a downhole tool, and particularly for a downhole subsurface safety valve ("SSSV"), as well as downhole flow control systems employing such an electromechanical linear actuator, and also related method. Embodiments may include any suitable combination of the features disclosed herein, including but not limited to the following examples.

Statement 1. An electromechanical brake, comprising: a brake housing, a first armature disposed in the brake housing, wherein the first armature further comprises a first braking surface; a second armature rotatably disposed in the brake housing for rotation by a motor, wherein the second armature comprises a second braking surface; an electrical coil energizable to urge the second armature into axial engagement with the first armature; and a rotational spring for biasing the first armature to a neutral rotational position relative to the brake housing while allowing a limited rotation of the first armature relative to the brake housing.

Statement 2. The electromechanical brake of Statement 1, further comprising: a rotational limiter for limiting the rotation of the first armature relative to the brake housing, the rotational limiter including a tab on the first armature or the brake housing and a shoulder on the other of the first armature or the brake housing positioned to interfere with the tab, and wherein the tab is circumferentially spaced from the shoulder when the first armature is in the neutral rotational position.

Statement 3. The electromechanical brake of Statement 1 or Statement 2, wherein the rotational limiter comprises an arcuate channel defining the shoulder at one end, wherein the tab projects into the arcuate channel.

Statement 4. The electromechanical brake of any one of Statements 1-3, wherein the rotational spring has a predefined range of travel to provide the limited rotation of the first armature relative to the brake housing.

Statement 5. The electromechanical brake of any one of Statements 1-4, wherein the rotational spring comprises a spiral torsion spring disposed about the first armature.

Statement 6. The electromechanical brake of any one of Statements 1-5, wherein the rotational spring comprises one or more flexible rods each extending radially from a respective spring pocket defined on the first armature to the brake housing.

Statement 7. The electromechanical brake of any one of Statements 1-6, wherein the spring pocket defines a range of circumferential play about the captured flexible rod.

Statement 8. The electromechanical brake of any one of Statements 1-7, further comprising: a plurality of spring pockets circumferentially spaced about the first armature, each spring pocket defining a ramped surface, wherein the rotational spring is initially captured in a first one of the spring pockets and is moveable along the ramped surface to an adjacent one of the spring pockets in response to a threshold torque between the brake housing and the first armature.

Statement 9. The electromechanical brake of any one of Statements 1-8, further comprising a ratchet mechanism allowing relative rotation between the first and second armature in one direction and opposing the relative rotation in an opposing direction.

Statement 10. The electromechanical brake of any one of Statements 1-9, wherein the ratcheting mechanism further comprises a ratchet gear and a ratchet paw.

Statement 11. An electromechanical braking system, comprising: a well tool; a motor for driving actuation of the well tool; a brake comprising a brake housing; a second armature rotatably disposed in the brake housing for rotation by the motor; an electrical coil energizable to urge the second armature into axial engagement with the first armature; and a rotational spring for biasing the first armature to a neutral rotational position relative to the brake housing while allowing at least a limited rotation of the first armature relative to the brake housing.

Statement 12. The electromechanical braking system of Statement 11, further comprising a rotary to linear converter coupled between the motor and the actuator, such that the actuator linearly actuates the well tool in response to the rotation of the motor.

Statement 13. The electromechanical braking system of Statement 11 or Statement 12, wherein the well tool comprises a tubing retrievable safety valve.

Statement 14. The electromechanical braking system of any one of Statements 11-13, wherein the rotational spring comprises at least one rotational spring selected from the group consisting of a spring element, a ratcheting element, or a combination thereof.

Statement 15. The electromechanical braking system of any one of Statements 11-14, further comprising a rotational limiter for limiting the rotation of the first armature relative to the brake housing, the rotational limiter including a tab on the first armature or the brake housing and a shoulder on the other of the first armature or the brake housing positioned to interfere with the tab, and wherein the tab is circumferentially spaced from the shoulder when the first armature is in the neutral rotational position.

Statement 16. The electromechanical braking system of any one of Statements 11-15, further comprising one or more spring pockets circumferentially spaced about the first armature, wherein the one or more spring pockets comprise at least one ramped surface, and wherein the rotational is initially captured in at least one of the one or more spring pockets.

Statement 17. The electromechanical braking system of any one of Statements 11-16, wherein the rotational spring comprises one or more flexible rods each extending radially from a respective spring pocket defined on the first armature to the brake housing.

Statement 18. A method comprising: an electromechanical braking system comprising: a motor, wherein the motor comprises a motor shaft; a first armature; and a second armature, wherein the second armature rotates with the motor; urging the second armature into axial engagement with the first armature to brake the rotation of the rotation of the motor shaft; and allowing a limited rotation of the first armature away from a neutral position relative to the brake housing in response to a transfer of torque from the second armature to the first armature; and biasing the first armature back toward the neutral rotational position.

Statement 19. The method of Statement 18, further comprising using the rotation of the motor shaft to actuate a downhole tool prior to the step of urging the second armature into axial engagement with the first armature.

Statement 20. The method of Statement 18 or Statement 19, wherein the downhole tool is actuated to an open position.

Therefore, the present embodiments are well adapted to attain the ends and advantages mentioned as well as those that are inherent therein. The particular embodiments disclosed above are illustrative only. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. An electromechanical brake, comprising:
   a brake housing;
   a first armature rotatably disposed in the brake housing, wherein the first armature further comprises a first braking surface;
   a second armature rotatably disposed in the brake housing for rotation by a motor, wherein the second armature comprises a second braking surface;
   an electrical coil energizable to urge the second armature into axial engagement with the first armature; and
   a rotational spring for biasing the first armature to a neutral rotational position relative to the brake housing while allowing a limited rotation of the first armature relative to the brake housing.

2. The electromechanical brake of claim 1, further comprising:
   a rotational limiter for limiting the rotation of the first armature relative to the brake housing, the rotational limiter including a tab on the first armature or the brake housing and a shoulder on the other of the first armature or the brake housing positioned to interfere with the tab, and wherein the tab is circumferentially spaced from the shoulder when the first armature is in the neutral rotational position.

3. The electromechanical brake of claim 2, wherein the rotational limiter comprises an arcuate channel defining the shoulder at one end, wherein the tab projects into the arcuate channel.

4. The electromechanical brake of claim 1, wherein the rotational spring has a predefined range of travel to provide the limited rotation of the first armature relative to the brake housing.

5. The electromechanical brake of claim 1, wherein the rotational spring comprises a spiral torsion spring disposed about the first armature.

6. The electromechanical brake of claim 1, wherein the rotational spring comprises one or more flexible rods each extending radially from a respective spring pocket defined on the first armature to the brake housing.

7. The electromechanical brake of claim 6, wherein the spring pocket defines a range of circumferential play about a captured flexible rod.

8. The electromechanical brake of claim 1, further comprising:
   a plurality of spring pockets circumferentially spaced about the first armature, each spring pocket defining a ramped surface, wherein the rotational spring is initially captured in a first one of the spring pockets and is moveable along the ramped surface to an adjacent one of the spring pockets in response to a threshold torque between the brake housing and the first armature.

9. The electromechanical brake of claim 1, further comprising a ratchet mechanism allowing relative rotation between the first and second armature in one direction and opposing the relative rotation in an opposing direction.

10. The electromechanical brake of claim 9, wherein the ratchet mechanism further comprises a ratchet gear and a ratchet paw.

11. An electromechanical braking system, comprising:
a well tool;
a motor for driving actuation of the well tool;
a brake comprising a brake housing;
a first armature rotatably disposed in the brake housing;
a second armature rotatably disposed in the brake housing for rotation by the motor;
an electrical coil energizable to urge the second armature into axial engagement with the first armature; and
a rotational spring for biasing the first armature to a neutral rotational position relative to the brake housing while allowing at least a limited rotation of the first armature relative to the brake housing.

12. The electromechanical braking system of claim 11, further comprising a rotary to linear converter coupled between the motor and an actuator, wherein the actuator linearly actuates the well tool in response to the rotation of the motor.

13. The electromechanical braking system of claim 12, wherein the well tool comprises a tubing retrievable safety valve.

14. The electromechanical braking system of claim 11, wherein the rotational spring comprises at least one rotational spring selected from the group consisting of a spring element, a ratcheting element, and any combination thereof.

15. The electromechanical braking system of claim 11, further comprising a rotational limiter for limiting the rotation of the first armature relative to the brake housing, the rotational limiter including a tab on the first armature or the brake housing and a shoulder on the other of the first armature or the brake housing positioned to interfere with the tab, and wherein the tab is circumferentially spaced from the shoulder when the first armature is in the neutral rotational position.

16. The electromechanical braking system of claim 11, further comprising one or more spring pockets circumferentially spaced about the first armature, wherein the one or more spring pockets comprise at least one ramped surface, and wherein the rotational is initially captured in at least one of the one or more spring pockets.

17. The electromechanical braking system of claim 11, wherein the rotational spring comprises one or more flexible rods each extending radially from a respective spring pocket defined on the first armature to the brake housing.

18. A method comprising:
an electromechanical braking system comprising:
a motor, wherein the motor comprises a motor shaft;
a first armature; and
a second armature, wherein the second armature rotates with the motor;
urging the second armature into axial engagement with the first armature to brake the rotation of the rotation of the motor shaft; and
allowing a limited rotation of the first armature away from a neutral rotational position relative to the brake housing in response to a transfer of torque from the second armature to the first armature; and
biasing the first armature back toward the neutral rotational position.

19. The method of claim 18, further comprising using the rotation of the motor shaft to actuate a downhole tool prior to the step of urging the second armature into axial engagement with the first armature.

20. The method of claim 19, wherein the downhole tool is actuated to an open position.

* * * * *